United States Patent
Madison

(10) Patent No.: US 9,593,882 B2
(45) Date of Patent: Mar. 14, 2017

(54) THREE-WAY INTEGRATED JOULE-THOMSON VALVE AND LIQUEFIED GAS EXPANDER

(71) Applicant: Ebara International Corporation, Sparks, NV (US)

(72) Inventor: Joel V. Madison, Reno, NV (US)

(73) Assignee: EBARA International Corporation, Sparks, NV (US)

(*) Notice: Subject to any disclaimer, the term of this patent is extended or adjusted under 35 U.S.C. 154(b) by 424 days.

(21) Appl. No.: 14/223,869

(22) Filed: Mar. 24, 2014

(65) Prior Publication Data

US 2014/0283938 A1 Sep. 25, 2014

Related U.S. Application Data

(62) Division of application No. 12/767,774, filed on Apr. 26, 2010, now Pat. No. 8,683,824.

(60) Provisional application No. 61/214,517, filed on Apr. 24, 2009.

(51) Int. Cl.
*F16K 11/074* (2006.01)
*F25J 1/02* (2006.01)
*F25J 1/00* (2006.01)

(52) U.S. Cl.
CPC ......... *F25J 1/0244* (2013.01); *F16K 11/074* (2013.01); *F25J 1/0022* (2013.01); *F25J 1/0042* (2013.01); *F25J 1/0257* (2013.01); *F25J 2240/30* (2013.01); *F25J 2240/40* (2013.01); *Y10T 137/86863* (2015.04)

(58) Field of Classification Search
None
See application file for complete search history.

(56) References Cited

U.S. PATENT DOCUMENTS

| | | | |
|---|---|---|---|
| 4,281,970 | A | 8/1981 | Stewart et al. |
| 4,421,537 | A | 12/1983 | Kuraoka |
| 4,456,461 | A | 6/1984 | Perez |
| 4,563,201 | A | 1/1986 | Brundige, Jr. |
| 4,788,829 | A | 12/1988 | Takemasa |
| 5,649,425 | A | 7/1997 | Matsumura |
| 6,155,076 | A | 12/2000 | Cullen |
| 6,441,508 | B1 | 8/2002 | Hylton |

(Continued)

FOREIGN PATENT DOCUMENTS

| | | | |
|---|---|---|---|
| JP | 61093211 A | 5/1986 | |
| JP | 03063465 A | 3/1991 | |

(Continued)

OTHER PUBLICATIONS

U.S. Appl. No. 12/767,774, filed Apr. 26, 2010, Madison.

(Continued)

*Primary Examiner* — John Fox
(74) *Attorney, Agent, or Firm* — Ray K. Shahani; Kin Hung Lai

(57) ABSTRACT

A cryogenic turbine expander system which consists essentially of a cryogenic liquid pressure vessel, and the vessel further accommodating a turbine expander, an internal bypass configuration, which are operable in parallel, a three-way valve to direct incoming high pressure liquefied gas flow to the turbine expander, or the internal bypass configuration, which further consists a Joule-Thomson valve, when the turbine expander is not operational.

1 Claim, 12 Drawing Sheets

(56) References Cited

U.S. PATENT DOCUMENTS

| | | | |
|---|---|---|---|
| 7,219,512 | B1 | 5/2007 | Wilding et al. |
| 7,415,840 | B2 | 8/2008 | Eaton et al. |
| 7,594,414 | B2 | 9/2009 | Wilding et al. |
| 7,624,586 | B2 | 12/2009 | Yuzawa et al. |
| 7,637,122 | B2 | 12/2009 | Turner et al. |
| 8,267,119 | B2 * | 9/2012 | Moench ............ F16K 11/074 123/41.1 |
| 8,397,757 | B2 * | 3/2013 | Kannoo ............ F16K 11/074 137/625.43 |
| 8,434,512 | B2 * | 5/2013 | Bergmann ......... F16K 11/074 137/625 |
| 2004/0261452 | A1 | 12/2004 | Mak et al. |
| 2006/0213223 | A1 | 9/2006 | Wilding et al. |
| 2006/0239871 | A1 | 10/2006 | Malhotra et al. |
| 2007/0107465 | A1 | 5/2007 | Turner et al. |
| 2008/0122226 | A1 | 5/2008 | Madison |
| 2009/0183505 | A1 | 7/2009 | Madison |
| 2009/0229275 | A1 | 9/2009 | Madison |
| 2013/0119666 | A1 | 5/2013 | Holt et al. |
| 2013/0263624 | A1 | 10/2013 | Vandor |

FOREIGN PATENT DOCUMENTS

| | | | |
|---|---|---|---|
| JP | 2007024192 A | | 2/2007 |
| WO | 2008/058792 | * | 5/2008 ............ F16K 11/074 |

OTHER PUBLICATIONS

U.S. Appl. No. 14/223,852, filed Mar. 24, 2014, Madison.

Habets, G.L.G.M. et al., (1999) 'Economics of Cryogenic Turbine Expanders', The International Journal of Hydrocarbon Engineering, Dec./Jan. 1998/99.

Habets, G. et al., (1999) 'Specification method to optimise power generation' Proceedings of the 61st Annual American Power Conference, Illinois Institute of Technology, Chicago, USA, Apr. 1999.

Kimmel, H.E., (1999) 'Optimised Power Plant Specification' Proceedings of the Generation Operations and Maintenance Conference, Oct. 14-15, 1999, Denver, Colorado, USA, Electric Utility Consultants Inc., Greenwood Village, Colorado 80121.

Kimmel, H.E., (2000) 'Optimising Power Generation using Black Box Specification Method' Proceedings of the 62nd Annual American Power Conference, Illinois Institute of Technology, Chicago, USA, Apr. 2000.

Kimmel, H.E., (2000) 'Cryogenic Francis Turbines' The 8th International Symposium on TransportPhenomena and Dynamics of Rotating Machinery, ISROMAC-8, Honolulu, Hawaii, Mar. 26-30, 2000.

Van den Handel, R. et al., (2000) 'A New Generation of Liquid Expanders in Operation at Oman LNG' Conference Papers GASTECH 2000, Houston, Texas, USA, Nov. 2000.

Song, M.C.K. et al., (2000) 'Cooling Cycle Expanders Improve LNG Liquefaction Process' CUChE-3, Third Joint China/USA Chemical Engineering Conference, Sep. 2000, Beijing, China.

Chiu, Chen-Hwa et al., (2001) 'Process Thermodynamics of Heavy Mixed Refrigerant Liquid Expanders' Natural Gas Utilization Topical Conference, 2001 AIChE Spring National Meeting, Apr. 2001, Houston,Texas, USA.

Habets, G.L.G.M. et al., (1999) 'Development of a Hydraulic Turbine in Liquefied Natural Gas' ImechE 7th European Congress on Fluid Machinery for the Oil, Petrochemical, and Related Industries, Apr. 1999, The Hague, NL, ISBN 1 86058 217 6.

Chiu, Chen-Hwa et al., (2000) 'LNG Process Control and Optimisation using Variable Speed Cryogenic Turbines', 3rd Joint China/ USA Chemical Engineering Conference, Beijing, China, Sep. 2000.

Kikkawa, Y. et al., (2001) 'Interaction between liquefaction process and LNG expanders' 2001 AICHE Spring National Meeting, Natural Gas Utilization Topical Conference, Houston, TX, USA, Apr. 2001.

Chiu, Chen-Hwa et al., (2001) 'Optimising Reduced Load Operation of LNG Expanders' 2001 AICHE Spring National Meeting, Natural Gas Utilization Topical Conference, Houston, TX, USA, Apr. 2001.

* cited by examiner

THREE-WAY INTEGRATED JOULE-THOMSON VALVE AND LIQUEFIED GAS EXPANDER

RELATED APPLICATIONS

This Application is a Divisional application and related to U.S. Non-provisional patent application Ser. No. 12/767,774 filed Apr. 26, 2010 entitled LIQUEFIED GAS EXPANDER AND INTEGRATED JOULE-THOMSON VALVE, which is related to and non-provisional of U.S. Provisional Patent Application Ser. No. 61/214,517 filed Apr. 24, 2009 entitled LIQUEFIED GAS EXPANDER AND INTEGRATED JOULE-THOMSON VALVE, which are both incorporated herein by reference in its entirety, and claims any and all benefits to which it is entitled therefrom.

FIELD OF THE INVENTION

The present invention pertains to a system that maximizes productivity of Liquefied Natural Gas plants, thereafter "LNG plants", and more specifically, to a cryogenic liquefied gas expander system that minimizes loss due to expander bypass flow.

BACKGROUND OF THE INVENTION

The installation of cryogenic turbine expanders in existing LNG plants presents a very effective upgrade with an advanced but field proven technology requiring relatively low investment costs and only short installation time. All LNG plants commissioned before 1996 are currently operating with an ineffective expansion valve. By replacing the existing Joule-Thomson valve a.k.a. J-T valve with a cryogenic turbine to expand the condensed natural gas from high pressure to low pressure, the thermodynamic efficiency of the existing refrigeration process is substantially improved, providing an increase of the total LNG output between about 5 to 7%. To attain this increase in efficiency, no substantial investments are necessary.

INTRODUCTION

LNG liquefaction plants have a complex structure with numerous systems interacting to produce the desired output. Capital investment and operation costs of these plants are relatively high. These high economic demands have initiated new and additional efforts to reduce the costs of natural gas liquefaction. The resulting innovations are already applied to new LNG liquefaction plants in Oman and Malaysia and the attained economical and technical benefits are convincing. It is anticipated that all future LNG liquefaction plants will incorporate these innovations.

By progressively increasing the profitability of new liquefaction plants, the gap between the productivity of existing and new LNG plants is widening and negatively affecting the competitiveness of existing plants. Consequently there is an inevitable demand to de-bottleneck and to upgrade existing LNG plants.

The installation of cryogenic turbine expanders in existing LNG plants presents a very effective upgrade with an advanced but field proven technology requiring relatively low investment costs and only short installation time. The conventional liquefaction process for natural gas is to operate at high pressure through the condensation phase, after which the high pressure of the condensed liquid natural gas is reduced by expansion across a Joule-Thomson valve, hereafter "J-T valve".

By replacing the existing JT-valve with a cryogenic turbine to expand the condensed natural gas from high pressure to low pressure the thermodynamic efficiency of the existing refrigeration process is substantially improved.

Habets et al., Chen-Hwa Chiu et al., and Kikkawa et al. presented comprehensive economical and technical analyses of the overall effect of cryogenic liquid expanders to the gas liquefaction process. Small improvements of the process economics are multiplied by the quantity of the liquefied natural gas, resulting in essential savings for the operational costs of the plant. Consequently the optimization of all technical and operational aspects of cryogenic liquid expanders, particularly LNG expanders as the largest cryogenic liquid expanders, is an important engineering target for the de-bottlenecking of existing LNG plants.

However, in the traditional cryogenic LNG expanders as shown in FIG. 9, it is still necessary to bypass the expander with a pipe and a J-T valve for safety reasons. The bypass process will result in approximately 7% loss in production.

SUMMARY OF INVENTION

LNG Expanders

Turbine expanders convert the hydraulic energy of the LNG fluid stream into electric energy, thus reducing the internal energy or enthalpy from the LNG. This conversion of energy occurs in two steps:

The hydraulic energy is transformed into mechanical shaft power, which is measured in shaft torque times rotational speed, while passing through the turbine The rotating turbine shaft drives an electrical generator which converts the mechanical shaft power into electrical power All turbine expanders consist essentially of the following two parts: the non-rotating nozzle vanes, which generate the incoming angular momentum of the LNG fluid; and the rotating turbine runner, which transforms the fluid momentum into torque. Therefore the thermodynamic expansion of LNG occurs predominantly within the turbine runner.

The conversion ratio of electric power output to hydraulic power input is called the efficiency of the turbine expander. The efficiency depends on the volumetric fluid flow and the pressure difference between inlet and outlet, which are the two primary turbine performance parameters.

For certain values of these two parameters the efficiency reaches its maximum value, and this is called the best efficiency point or BEP. It is possible to move the BEP to a different location by adding a new design parameter, e.g. the rotational speed of the turbine expander. By changing the rotational speed, the BEP can be continuously shifted during the operation of the turbine but not without observing small changes in the value of the BEP.

The shifting of the BEP leads to another optimum value: the absolute best efficiency point or ABEP.

The performance of variable speed LNG turbine expanders is best described in a graphical presentation using the Q-H-plane with the volumetric flow Q as abscissa and the differential head H as ordinate. The hydraulic efficiency $\eta$ and the shaft power P are the two most important performance parameters for variable speed LNG expanders. The curves for constant efficiency $\eta$ and for constant shaft power P in the Q-H-plane are derived from the equations for conservation of energy and conservation of momentum and are shown in FIG. 1 (prior art). The constant efficiency curves are parabolas intersecting at the zero-point.

For each efficiency value there are two corresponding parabola curves except for the unique maximum efficiency $\eta_{max}$. The two zero efficiency curves correspond to the no-load characteristic and to the locked rotor characteristic.

The equation for the constant efficiency curves is the following:

$$H = Q_2[\phi(\eta, \alpha, \beta, \lambda, \tau, \rho)] \qquad (1)$$

with $\phi$ as a function of the constants $\eta$, $\alpha$, $\beta$, $\lambda$, $\tau$, and $\rho$ only. Derived from this equation the efficiency of variable speed turbine expanders depends only on one parameter p, the ratio $p = H/Q_2$.

The constant shaft power curves, which are shaped like the Greek letter v, are also obtained from the two equations of conservation of energy and momentum and represent higher order polynomials.

$$H = Q_2\{\alpha + [\beta/4\lambda_2][1 \pm (1 - 4\lambda P/\tau Q_3)^{1/2}]\} \qquad (2)$$

With increasing power P, the curves move towards higher values of Q and H. For large values of Q the constant shaft power curves approach asymptotically the two parabolic zero efficiency curves. Thus the hydraulic performance of variable speed LNG expanders is best described with two sets of curves: the constant shaft power curves and the constant efficiency curves.

The performance range of the LNG expander is limited by two characteristic curves that are parabolically shaped: the no-load characteristic and the locked rotor characteristic. It applies for both characteristics that the power and the efficiency are equal to zero, and the constant power curve and constant efficiency curve are identical for P=0 and $\eta$=0.

Specification of Rated Point

The output of LNG plants varies within a certain time period and depends on sales demand, feed gas mixture and factors such as ambient temperature and cooling water temperature. It is desirable to operate the turbine expander for all these different mass flows at the BEP to achieve maximum economic benefits.

This can be accomplished by using the described method to shift the BEP. This shifting method has its limitation, as it is not possible to change the absolute best efficiency point ABEP. The ABEP has a fixed location for a specific design of any type of turbine expander. It is beneficial to specify the best location of the ABEP during the project engineering stage, in order to receive the maximum economic benefits for the turbine expander during a specific time period of operation, for instance during the period of 12 months. This is a more difficult problem because the efficiency function is unknown during the project-engineering phase, and the selection of the ABEP must be valid for different expander designs and manufacturers. The problem of the ABEP location, which should also be identical to the rated point of the expander, is not a technical but an economical one and can be solved with the following method. The solid line in FIG. 2 shows a typical curve for the turbine expander efficiency. The efficiency is a function of the parameter $p = H/Q_2$ as previously described. The efficiency function is unknown until the expander has been selected and the conventional method to analyse unknown functions is to expand a generally presumed function into a Taylor polynomial of a certain degree. A Taylor polynomial of the second degree offers an acceptable quadratic approximation, particularly if it is expanded at the optimum. The dotted curve in FIG. 2 demonstrates a quadratic Taylor polynomial which is expanded at the BEP for the parameter $p = H/Q_2$.

Because of the above-described condition for the BEP, the first derivative of the efficiency function or the linear term of the Taylor polynomial is zero, and with $\eta_{BEP}$=unknown efficiency at the BEP, C=unknown constant, p=input parameter $H/Q_2$, and q=unknown BEP location, the Taylor polynomial is reduced to:

$$\eta = \eta_{BEP} - \Sigma C(p-q)_2 \qquad (3)$$

The value of the parameter p changes over the observed time period with $p = p_x$ during the time ratio $t_x$. The time ratio is the individual time period over the total sum of all time periods. Habets and Kimmel have shown that the optimal location q for the BEP can be calculated by the formula:

$$q = \Sigma t_x p_x \qquad (4)$$

The meaning of this solution is that for different values of the parameter $p = H/Q_2$, and within a certain period of time, the optimal location of the BEP, in terms of this parameter, is defined as the sum of all time ratio weighted values of the parameter p. The solution for the optimum location of the BEP has been developed for an undefined expander. The formula offers a very practical algorithm to specify the optimal rated point for LNG turbine expanders, independent of their particular design.

FIG. 3 illustrates the method for optimal performance specification. The dotted curve shows the conventional specification for the rated point, where the operation point with the highest time ratio is identical to the rated point and to the best efficiency point. All other operational points are off the BEP on the declining part of the efficiency curve.

The solid line demonstrates the optimized performance specification. The optimized BEP is now between all operation points and, in general, none of the operation points are directly located at the BEP. Therefore, for optimal performance specification, the rated point is still identical to the BEP or ABEP, but not to the operation point with the highest time ratio. The distribution of all operation points are such that the summation of all the products of efficiency multiplied by the operation time for each operational case during a certain period of time will be a maximum value.

The method of optimal performance specification for LNG expanders suggests the maximum enthalpy reduction for the liquefied gas under the consideration of time related changes in the output and operation of LNG plants. The time related output of the plant is well known and optimal specifications can be provided, particularly for existing LNG plants, which are subject to a de-bottlenecking project.

The present method of cryogenic LNG turbine expanders replacing J-T valves with the possibility of process optimization inherent to variable speed LNG expanders and their technological benefits are ideal solutions for de-bottlenecking existing LNG plants. The increase in LNG output offers pay back times of less than one year.

The present invention is a further improvement to current cryogenic LNG expanders. The system consists essentially of integrated cryogenic LNG turbine expanders and J-T valve system that is specifically designed for flammable liquefied gases.

Benefits and features of the invention are made more apparent with the following detailed description of a presently preferred embodiment thereof in connection with the accompanying drawings, wherein like reference numerals are applied to like elements.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 9:
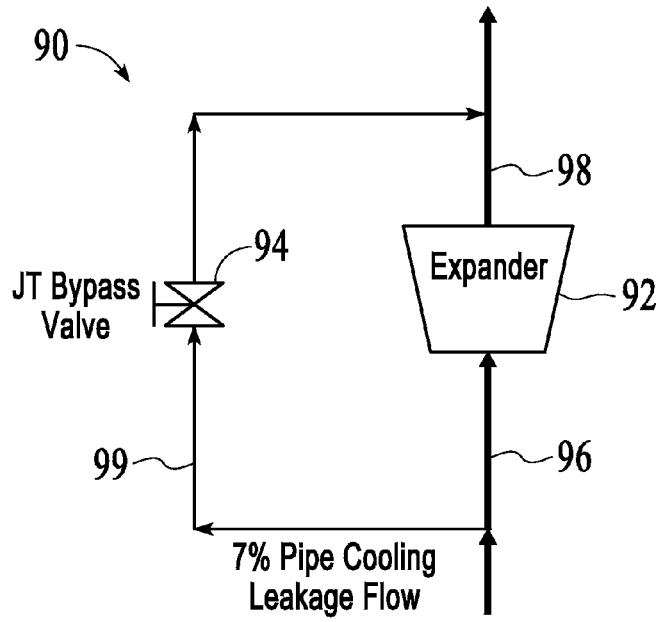
FIG. 9 (prior art) is a representative diagram showing a conventional configuration of a cryogenic liquefied gas expander system 90.

FIG. 9 (prior art) is a representative diagram showing a conventional configuration of a cryogenic liquefied gas expander system 90. As mentioned above, cryogenic turbine expanders convert the hydraulic energy of the fluid stream into electric energy, thus reducing the internal energy or enthalpy from the liquid. In one embodiment, the cryogenic temperatures of the present invention is defined as the approximate range below 240 K, −24.7° F. or −33.2° C. As shown in FIG. 9, LNG flow through cryogenic liquid expander 92 during the expansion process. However, it is necessary to install an external bypass route encompassing throttling valve(s) such as J-T valve(s) 94 and pipes. The bypass route acts as a security measure in the event of a failure of the cryogenic liquefied gas expander 92 or during maintenance. In the event of a failure or maintenance, the bypass route must have the capacity to process the entire incoming cryogenic flow 96 instantly. To attain this objective, the bypass route has to be kept at cryogenic temperatures at all times since expander failure can happen anytime. Otherwise, pipes and valve(s) of the bypass route would crack when the incoming cryogenic flow 96 suddenly passes there through. In prior art expander systems, approximately 7% by mass of the incoming cryogenic flow 96, viz the pipe cooling leakage flow 99, will pass through the bypass route at all times to maintain its cryogenic temperature. Since the pipe cooling leakage flow 99 does not pass through liquid expander 92, it is considered a loss in the expansion process.

Additionally, cryogenic liquefied gas expander system 99 should not process any flammable liquefied gases such as natural gas, methane, propane ammonia, ethylene, etc. to avoid explosions and fire hazards. However, the system 100 of the present invention is capable of processing flammable liquid due to its unique configuration, which the system 100 is entirely contained within stainless steel pressure vessel 102.

Figure 10:
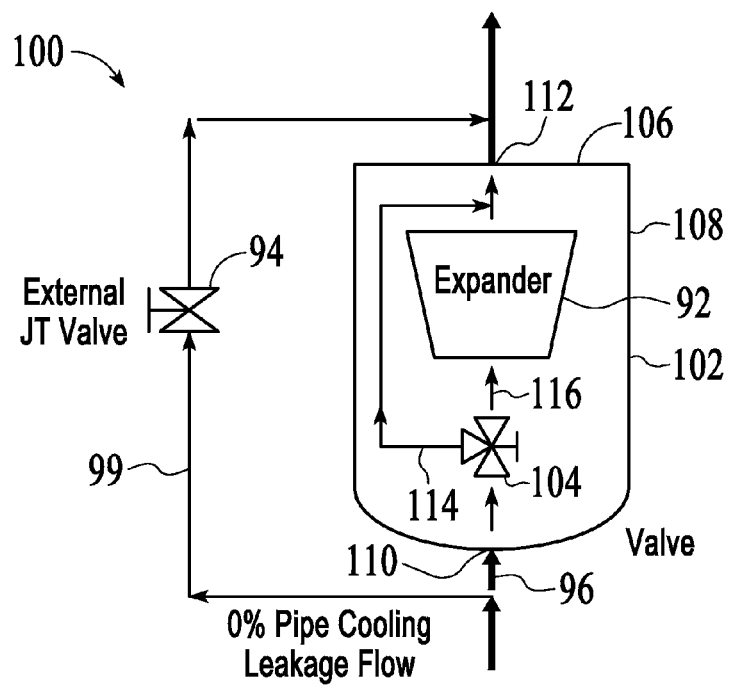
FIG. 10 is a representative diagram showing integrated cryogenic liquefied gas expander and J-T valve system of the present invention 100.

FIG. 10 is a representative diagram showing integrated cryogenic liquefied gas expander and J-T valve system of the present invention 100. In one embodiment, integrated cryogenic liquefied gas expander and J-T valve system of the present invention 100 further comprises cryogenic liquefied gas expander 92, stainless steel pressure vessel 102, a throttling valve which is called a three-way cross-flow J-T valve 104 and external J-T valve(s) 94. The cryogenic liquefied gas expander 92 can be a constant speed liquefied gas expander or a variable speed liquefied gas expander. In one embodiment, cryogenic liquefied gas expander 92, a three-way cross-flow J-T valve 104 are mounted inside stainless steel pressure vessel 102 which is kept under controllable pressure and in cryogenic temperatures of the approximate range below 240 K, −24.7° F. or −33.2° C., to form collectively integrated cryogenic liquefied gas expander 108.

The setup of the present invention 100 also enables processing of flammable liquefied gases without the high risk of explosions and fire hazards. Incoming high pressure cryogenic flow 96 passes in stainless steel pressure vessel 102 via cryogenic liquid inlet 110 and subsequently through the three-way cross-flow J-T valve 104. In one embodiment, three-way cross-flow J-T valve 104 is a rotating 3-way valve which direct incoming cryogenic flow 96 to cryogenic liquefied gas expander 92 for expansion and processing under normal circumstances; and to an internal bypass route 114 in the event of failure and maintenance of cryogenic liquefied gas expander 92. Since the entire internal bypass route including the pipes and the three-way cross-flow J-T valve 104 are kept at cryogenic temperatures, it is unnecessary to have a constant internal pipe cooling flow through the internal bypass route and hence loss is reduced. As best shown in FIG. 10, the pipe cooling leakage flow 99 will be greatly reduced to approaching 0%, hence greatly reduce the loss of the expansion process.

Figure 11:
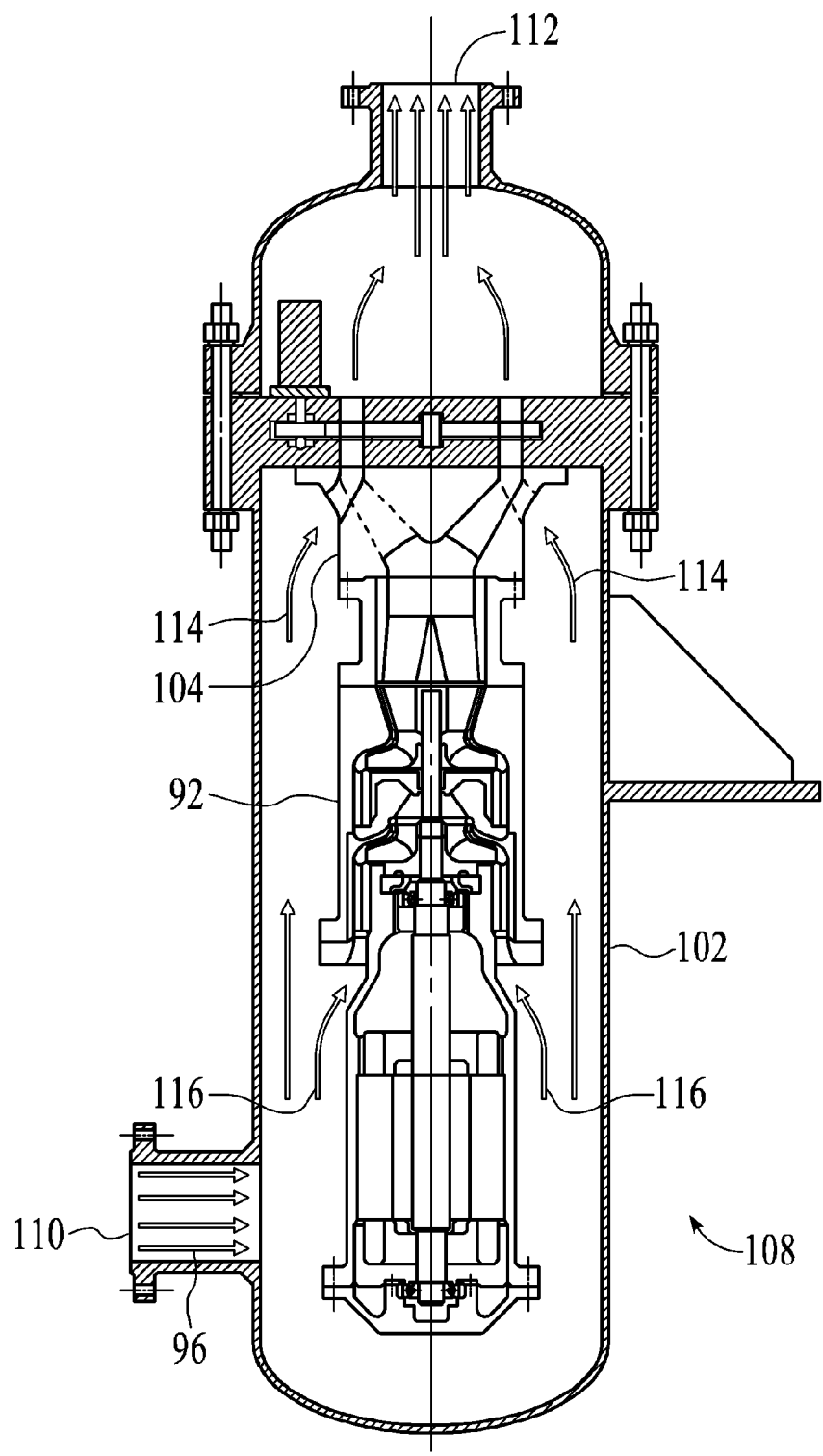
FIG. 11 is a representative sectional view of the integrated cryogenic liquefied gas expander 108.

FIG. 11 is a representative sectional view of the integrated cryogenic liquefied gas expander 108. As shown in FIG. 11, high pressure incoming cryogenic flow 96 passes cryogenic liquid inlet 110 and enter the stainless steel pressure vessel 102 and continue to pass through cryogenic liquefied gas expander 92 for expansion under normal circumstances. Then the low pressure outgoing flow will be guided out of stainless steel pressure vessel 102 through outlet 112. In the event of failure or maintenance, an internal bypass flow 114 will pass through the three-way cross-flow J-T valve 104 and eventually out of stainless steel pressure vessel 102 through outlet 112.

Figure 12:
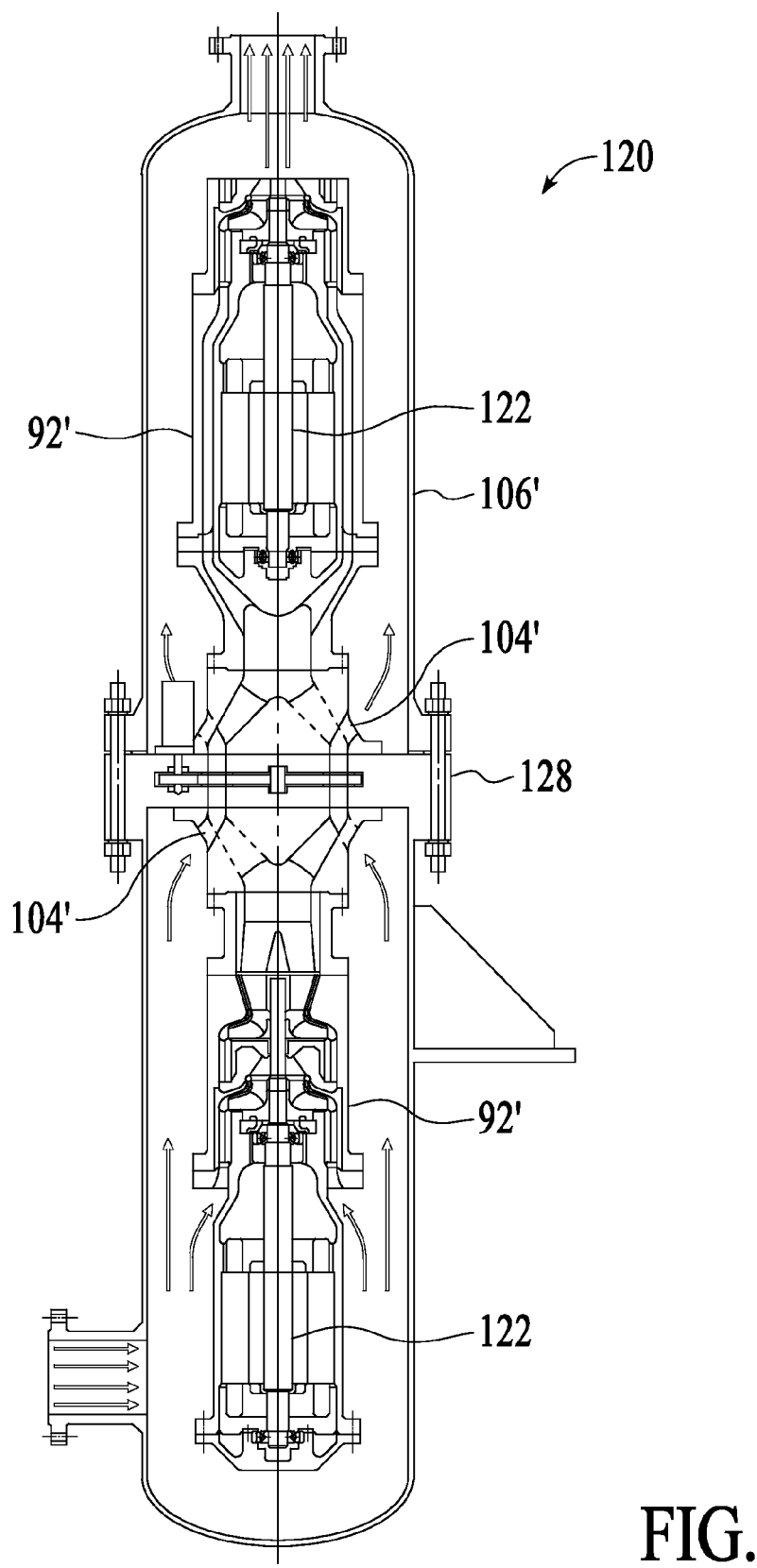
FIG. 12 is a representative sectional view of a cross-flow integrated cryogenic liquefied gas expanders 120.

FIG. 12 is a representative sectional view of a cross-flow integrated cryogenic liquefied gas expanders 120. Alternatively, two cryogenic liquefied gas expanders 92' can be mounted and connected inline to an intermediate support plate 128 inside a single stainless steel pressure vessel 106' as best shown in FIG. 12. The two cryogenic liquefied gas expanders 92' have separate shafts 122 and generators. In one embodiment, both expanders 92' are operated in parallel, in series, individually or combination thereof. A cross-flow valve 104' is installed to allow flow control to both expanders 92'. The cross-flow integrated cryogenic liquefied gas expanders 120 allow a two-phase possibility. Other advantages of the cross-flow integrated cryogenic liquefied gas expanders 120 includes up to 50% turndown, high machine efficiency with turndown, higher flow capacity and greater flexibility as in two-phase operation possibility and also relatively small footprint.

Figure 13A:
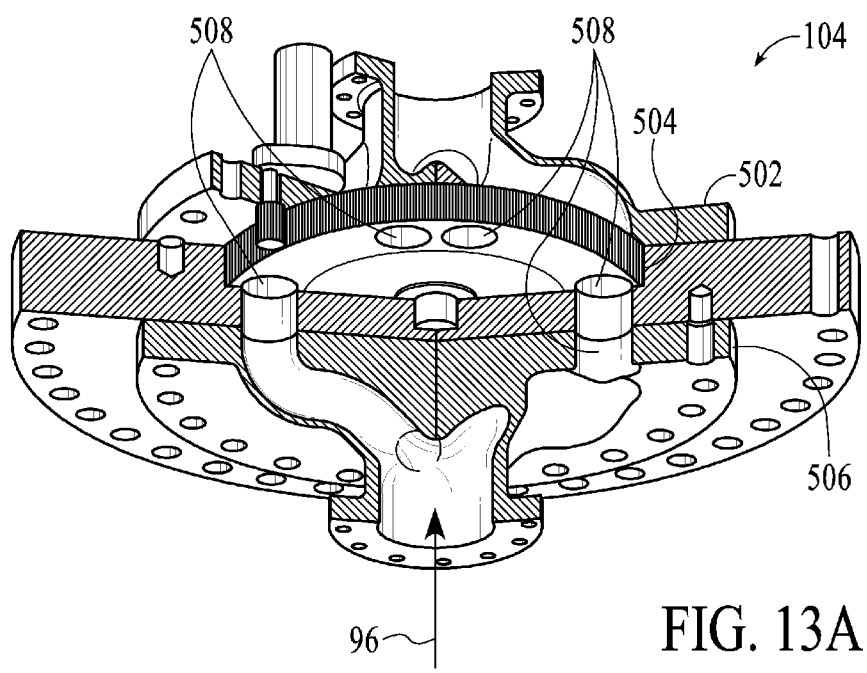
FIG. 13A is a representative sectional view of three-way cross-flow J-T valve 104.
Figure 13B:
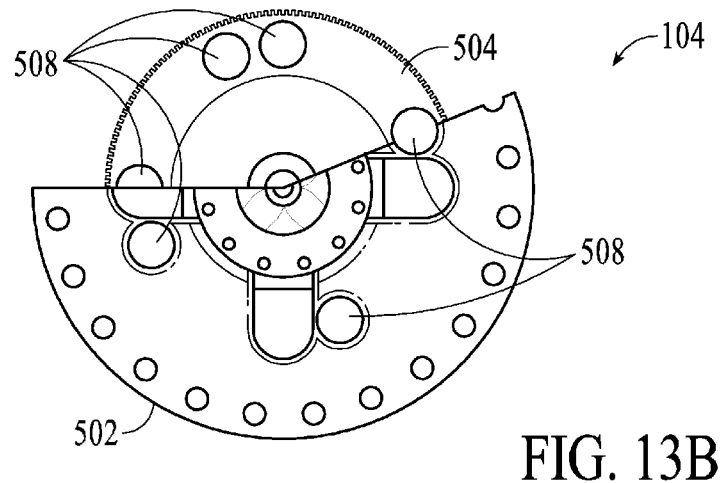
FIG. 13B is a representative top view of three-way cross-flow J-T valve 104.

FIGS. 13A and 13B are representative sectional view and top view respectively of cross-flow J-T valve 104. In one embodiment, the three-way cross-flow J-T valve 104 has a flat embodiment further composed essentially of top plate 502, middle plate 504 and bottom plate 506. As shown in FIG. 13A, each plate has a plurality of through apertures 508 on their rim. In one embodiment, middle plate 504 is driven by a motor to rotate perpendicularly to the shaft 122 (not shown). As middle plate 504 rotates, it gives free fluid passage either through cryogenic liquefied gas expander 92 and closing the bypass inside the vessel, or gives free passage to the bypass route and closing the passage to through the expander 92. As middle plate 504 is rotating, it closes or opens the passages if apertures 508 in all three plates align at least partially, and closes a passage if the apertures 508 do not align.

Advanced Process Control

Figure 1:
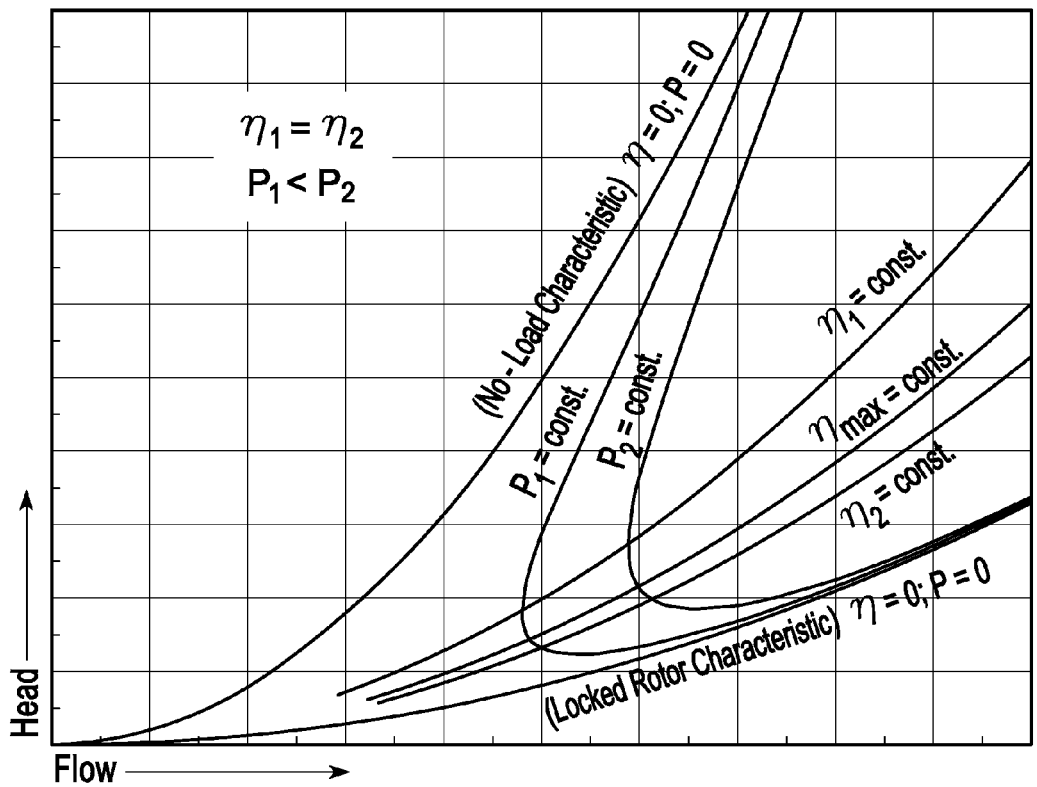
FIG. 1 (prior art) is a representative chart showing the hydraulic performance of variable speed LNG expanders.
Figure 2:
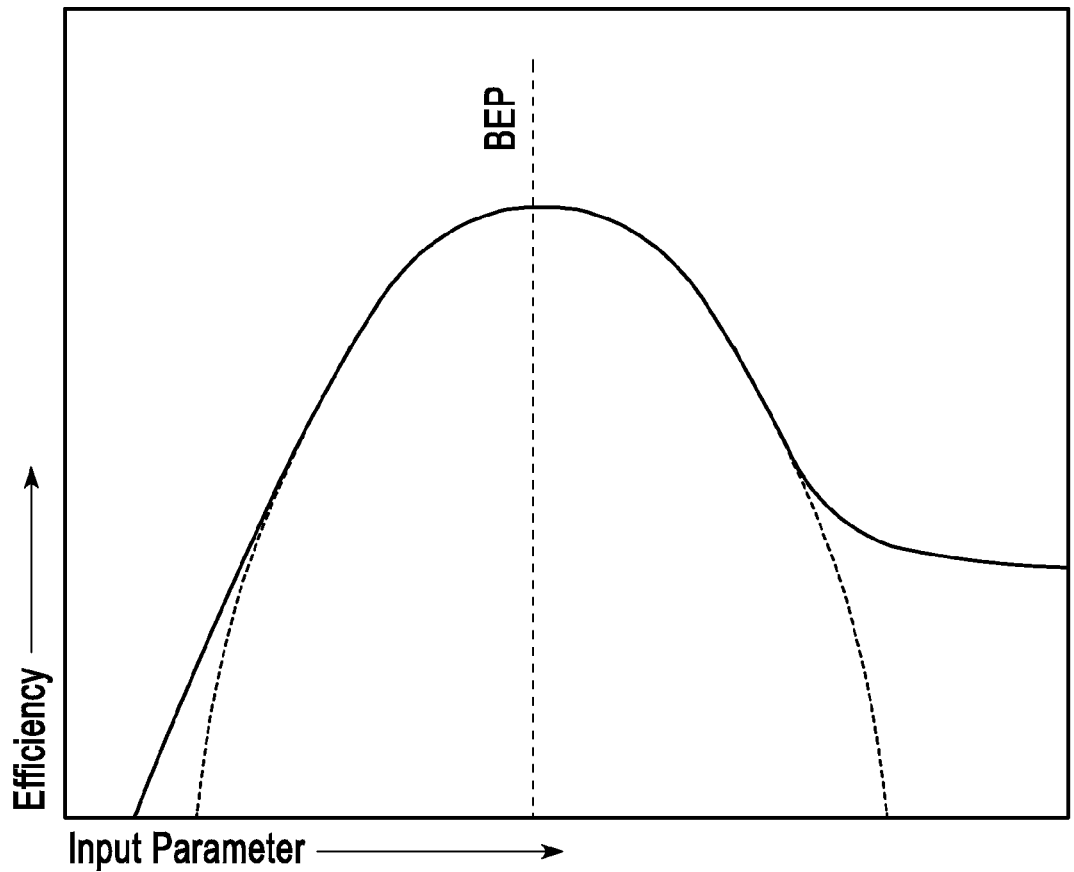
FIG. 2 (prior art) is a representative chart showing a typical curve for turbine expander efficiency.
Figure 3:
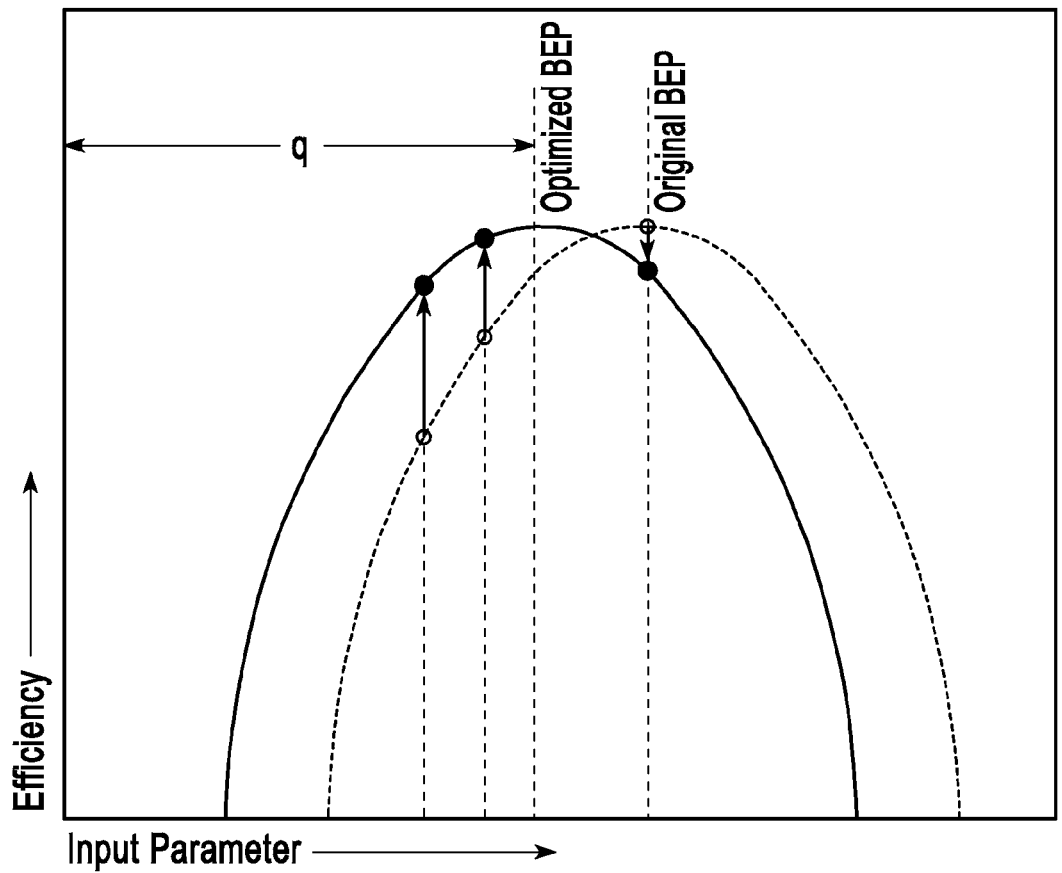
FIG. 3 (prior art) is a representative chart showing optimal performance specification.
Figure 4:
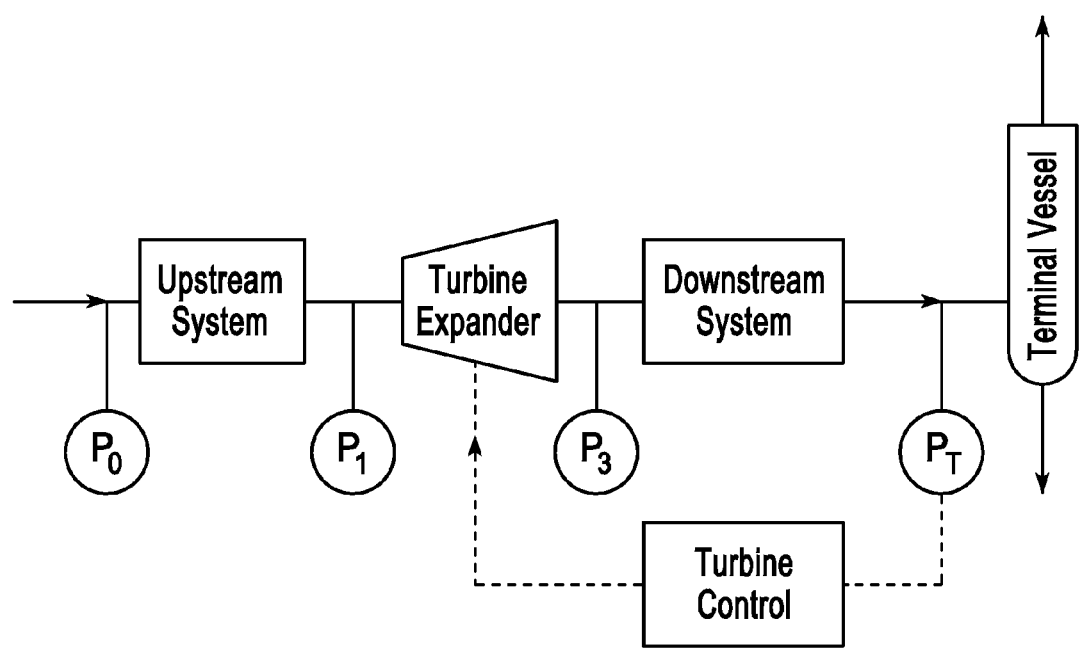
FIG. 4 is a representative chart showing process optimization with variable speed LNG expander.

The installation of variable speed LNG expanders in existing LNG plants offers further improvements to the overall process. In conventional gas liquefaction plants liquid expanders are operated as close as possible at the best efficiency point (BEP), which is defined for certain flow rates and expansion ratios. FIG. 4 shows a typical process arrangement to operate the liquid expander at the BEP. Because of variations and uncertainties of the pressure drop in the system, it is necessary to install a control valve preferably between the expander and downstream system to meet the best efficiency point of the expander.

If the turbine is expanding the differential pressure ($P_1-P_2$), then the control valve expands exactly the remaining differential pressure ($P_2-P_3$) to meet the target pressure $P_T$ of the terminal vessel. The control valve reduces the liquid pressure in a Joule-Thomson expansion without any enthalpy reduction and with zero isentropic efficiency.

This inefficient Joule-Thomson expansion has to be as small as possible to increase the overall process efficiency. Variable speed liquid expanders operate at variable differential pressures and variable flow rates and are therefore essentially both a turbine and a control valve.

Figure 5:
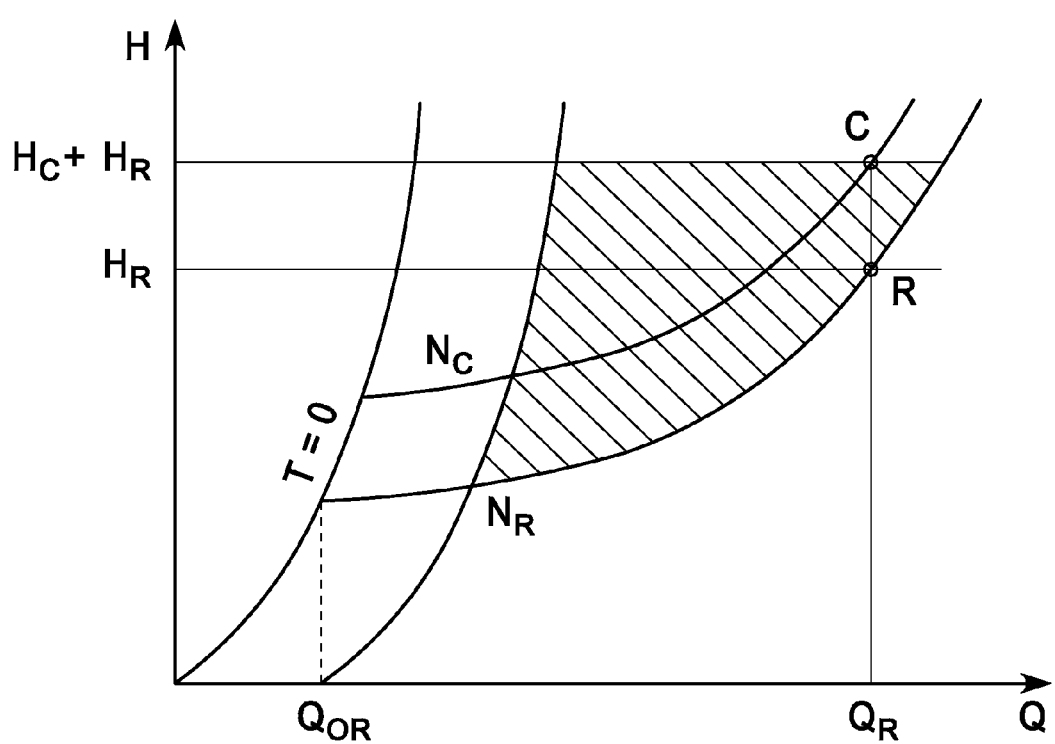
FIG. 5 is a representative chart showing the range of process optimization.

FIG. 5 demonstrates the process arrangement for a variable speed liquid expander operating simultaneously as a control valve. The expander is able to expand the total differential pressure ($P_1-P_3$) to the exact value necessary to meet the target value $P_T$.

The differential pressure ($P_2-P_3$) is now expanded through the turbine additionally reducing the enthalpy of the liquefied gas and increasing the power recovery. The target pressure $P_T$ in the terminal vessel determines the correct speed of the turbine expander, the control speed $N_C$. This advanced method of controlling the overall process through the expansion ratio of the turbine expander offers a maximum power recovery and enthalpy reduction of the liquefied gas.

Reduced Flow Operation

In most cases of project engineering the selection of the rated point for the LNG expander is determined to operate at the maximum efficiency $\eta_{max}$. During the practical operation of the liquefaction plant the LNG expander operates temporary at reduced flow, but maintaining the higher pressure.

Figure 6:
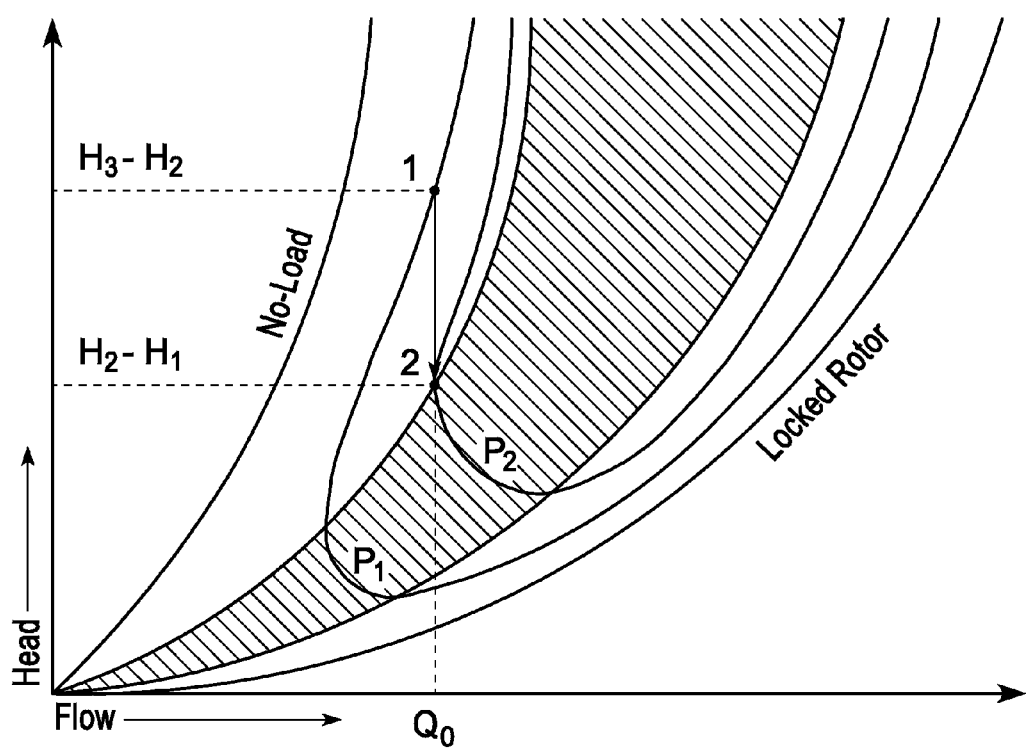
FIG. 6 is a representative chart showing the optimization power output for reduced flow.

FIG. 6 demonstrates the LNG expander performance for reduced flow. The LNG is expanded with a differential head of ($H_3-H_2$) across the turbine expander. The generated power $P_1$ is relatively small and depends on the location of the point 1. The closer point 1 is to the no-load characteristic, the smaller the value of generated power. If point 1 is located at the no-load characteristic then the LNG expander generates zero power.

By reducing the differential head from ($H_3-H_1$) to ($H_2-H_1$) and shifting the point 1 to point 2 and maintaining the same reduced flow $Q_0$, the power output of the LNG expander increases due to the characteristic shape of the constant power curves. Point 2 is located at the power curve for $P_2$=constant and $P_2>P_1$.

The increase of power output is optimized when the vertical line through $Q_0$ is also the vertical tangential line on the constant power curve. All vertical tangents to the constant power curves determine the locus of all points for optimized power generation at reduced flow condition. The locus of these optimized power points is a parabolically shaped curve shown in FIG. 4 as the left-sided borderline of the hatched area. The power output of LNG expanders operating under reduced flow and to the left of this borderline (example point 1) can be significantly increased if the differential head across the turbine expander is reduced to meet the borderline (example point 2).

Figure 8:
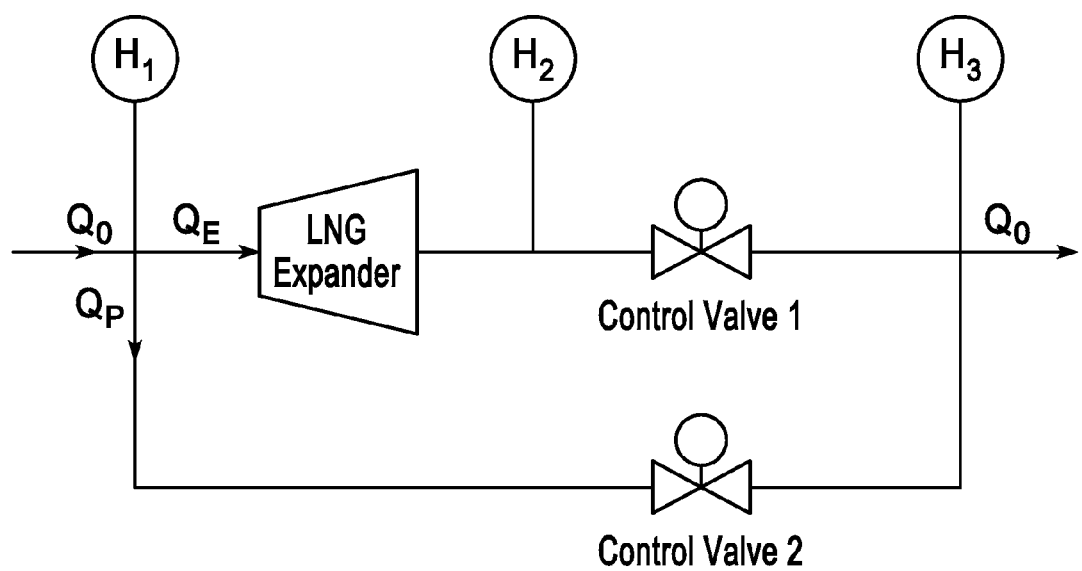
FIG. 8 is a representative chart showing the control schematic for optimized expander operation.

FIG. 8 presents the control schematic to achieve the optimized expander operation. A control valve 1 operating as controllable pressure reduction or J-T valve is installed upstream or preferably downstream of the LNG expander. Parallel to the expander and the control valve 1 is a bypass with a second J-T valve or control valve 2.

To optimize the power for reduced flow, control valve 2 is completely closed with the bypass flow $Q_P=0$, and the condition $Q_0=Q_E$. Control valve 1 reduces the differential head ($H_3-H_2$) to the optimum differential head ($H_2-H_1$) for the LNG expander. To achieve this optimum differential head across the LNG expander, the rotational speed of the turbine expanders is reduced to the corresponding value of the hydraulic performance characteristic.

The control schematic for optimized expander operation at reduced flow condition, practically consistent of only one control valve downstream or upstream the variable speed LNG expander, presents an efficient method to significantly increase the power output of the LNG expander. The optimized power output at reduced flow from originally low or zero power up to 50% of the rated power offers a significant economical benefit for the plant operational costs.

Overflow Operation

The temporary operation of LNG expanders for overflow condition caused by increased flow and/or reduced differential head occurs less frequent than operation at reduced flow, but the benefits of improvements are multiplied by the larger flow.

Figure 7:
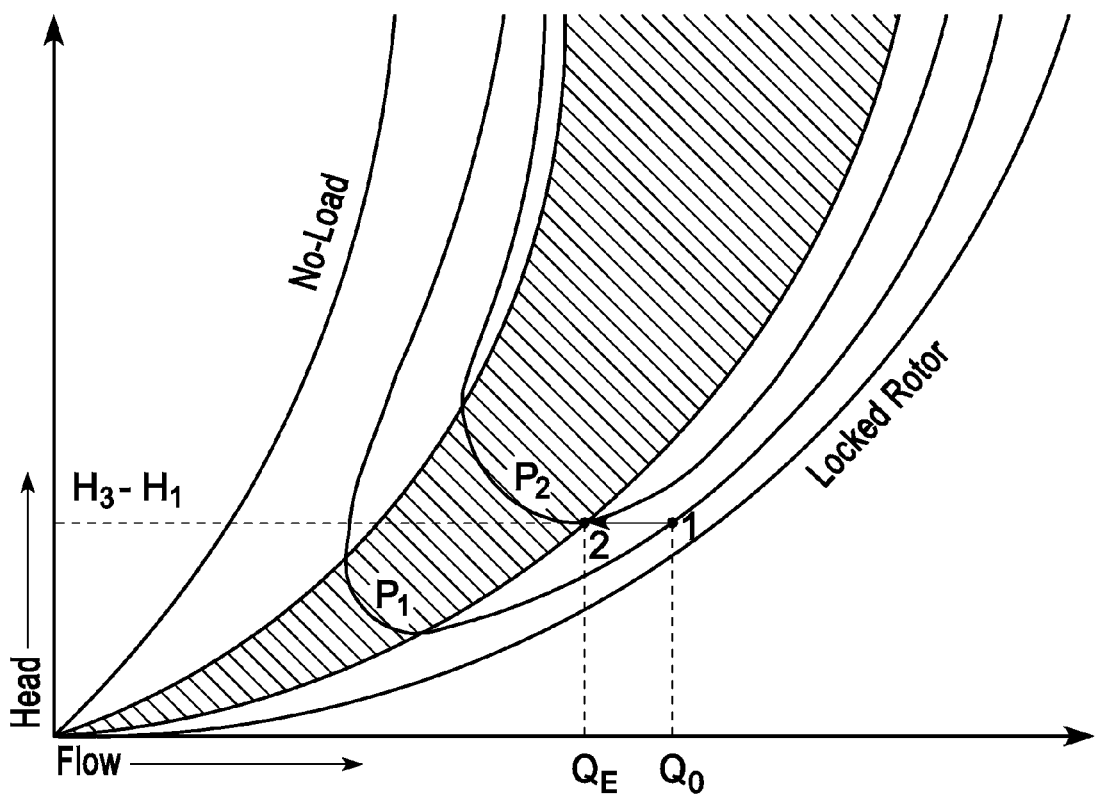
FIG. 7 is a representative chart showing the optimizing power output for overflow.

FIG. 7 demonstrates the LNG expander performance for overflow condition. The LNG with a flow rate of $Q_0$ is expanded with a differential head of ($H_3-H_1$) across the turbine expander. The generated power $P_1$ is relatively small and depends on the location of the point 1. The closer point 1 is to the locked rotor characteristic, the smaller the value of generated power. If point 1 is located at the locked rotor characteristic, then the LNG expander generates zero power.

By reducing the flow from $Q_0$ to $Q_E$ and shifting the point 1 to point 2 and maintaining the same differential head ($H_3$–$H_1$), the power output of the LNG expander is again increased due to the characteristic shape of the constant power curves. Point 2 is located at the power curve for $P_2$=constant and $P_2$>$P_1$.

The increase of power output is optimized when the horizontal line through ($H_3$–$H_1$) is also the horizontal tangential line on the constant power curve. The locus of all points for optimized power generation at overflow condition is determined by all horizontal tangents to the constant power curves. The locus of these optimized power points is a parabolically shaped curve shown in FIG. 7 as the right-sided borderline of the hatched area. The power output of LNG expanders operating under overflow condition and to the right of this borderline, e.g. example point 1 can be significantly increased if the flow across the turbine expander is reduced to meet the borderline, e.g. example point 2.

The control schematic for optimized expander operation shown in FIG. 8 is also applicable for overflow operation. To optimize the power output for overflow, control valve 2 in the bypass line is partially open expanding the flow rate $Q_P$ with a differential head of ($H_3$–$H_1$). Control valve 1 is completely open and the LNG expander reduces the differential head ($H_3$–$H_1$) for the flow rate QE.

To achieve this optimum flow $Q_E$ across the LNG expander, the rotational speed of the turbine expanders is increased to the corresponding value of the hydraulic performance characteristic.

The control schematic for optimized expander operation at overflow condition, practically consistent of only one control valve in a bypass line to the LNG expander, presents an efficient method to significantly increase the power output of the LNG expander. The optimized power output at overflow condition from originally low power up to 30% of the rated power offers an additional economical benefit for the plant operational costs.

The method of cryogenic LNG turbine expanders replacing J-T valves and the possibility of process optimization inherent to variable speed LNG expanders and their technological benefits are ideal solutions for de-bottlenecking existing LNG plants. The increase in LNG output offers pay back times of less than one year.

The integrated cryogenic liquefied gas expander and J-T valve system 100 of the present invention eliminate required leakage flow 99 to keep bypass route at cryogenic temperatures and also optimizes power output for both reduced and overflow conditions.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A flat three-way valve in a flat design for use in a cryogenic liquefied gas expansion system, the three-way valve further comprising:
   one inlet portion and two outlet portions, a first outlet portion connected to a cryogenic turbine expander and a second outlet portion connected to an internal Joule-Thomson valve; and
   three horizontal flat disc portions all having a common center and a plurality of apertures on each disc portion's rim, the middle flat disc portion driven by an external motor and rotated such that the apertures of the three flat disc portions open and close passages between the inlet portion and the first and second outlet portions.

* * * * *